(12) United States Patent
Karmous et al.

(10) Patent No.: US 12,187,196 B2
(45) Date of Patent: *Jan. 7, 2025

(54) INFANT OBSERVATION MIRROR ASSEMBLY WITH TEMPERATURE DISPLAY ATTACHABLE TO AUTOMOBILE SEAT

(71) Applicant: Thermomirror LLC, Garland, TX (US)

(72) Inventors: Kareem Karmous, Raleigh, NC (US); Maged Atia, Garland, TX (US)

(73) Assignee: Thermomirror LLC, Garland, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/203,694

(22) Filed: May 31, 2023

(65) Prior Publication Data

US 2023/0302993 A1 Sep. 28, 2023

Related U.S. Application Data

(63) Continuation of application No. 16/942,989, filed on Jul. 30, 2020, now Pat. No. 11,667,238.

(Continued)

(51) Int. Cl.
*B60R 1/00* (2022.01)
*B60R 1/06* (2006.01)
(Continued)

(52) U.S. Cl.
CPC ............ *B60R 1/008* (2013.01); *B60R 1/0612* (2013.01); *G02B 7/1824* (2013.01); *B60N 2002/905* (2018.02); *B60R 2001/123* (2013.01)

(58) Field of Classification Search
CPC . B60R 1/008; B60R 1/0612; B60R 2001/123; B60N 2002/905
(Continued)

(56) References Cited

U.S. PATENT DOCUMENTS 4,882,565 A * 11/1989 Gallmeyer ............... B60Q 3/14
340/461
5,103,347 A * 4/1992 Lumbra .................. G02B 7/182
248/489

(Continued)

OTHER PUBLICATIONS

PCT, International Search Report in International application No. PCT/US2020/044147 dated Oct. 30, 2020.
(Continued)

*Primary Examiner* — Ricky D Shafer
(74) *Attorney, Agent, or Firm* — NK Patent Law

(57) ABSTRACT

Infant observation mirror assembly with temperature display for attachment to a top portion of a rear vehicle seat includes a main panel having opposed front and rear surfaces and a mirror embedded in the front surface thereof. The mirror assembly further includes a temperature display section defined on the front surface of the main panel. A positioning base is coupled to the rear surface of the main panel. The main panel is pivotably attached to the positioning base for allowing rotation about a horizontal axis and a vertical axis. A mounting harness attaches to the positioning base. The mounting harness removably attaches to the top portion of the rear vehicle seat to hold the mirror assembly in a selected lateral and vertical position on the rear vehicle seat.

19 Claims, 5 Drawing Sheets

Related U.S. Application Data

(60) Provisional application No. 62/885,444, filed on Aug. 12, 2019.

(51) Int. Cl.
*G02B 7/182* (2021.01)
*B60N 2/90* (2018.01)
*B60R 1/12* (2006.01)

(58) Field of Classification Search
USPC .............................. 359/839, 870, 871, 872
See application file for complete search history.

(56) References Cited

U.S. PATENT DOCUMENTS

| | | | | |
|---|---|---|---|---|
| 5,455,716 | A * | 10/1995 | Suman | G07C 9/00182 359/872 |
| 6,354,708 | B1 * | 3/2002 | Monahan | B60R 1/008 359/872 |
| 6,585,384 | B2 * | 7/2003 | Nielsen | B60R 1/008 359/838 |
| 7,222,977 | B1 * | 5/2007 | Darling | B60R 1/008 362/135 |
| 7,862,189 | B1 | 1/2011 | Freese | |
| 8,049,640 | B2 * | 11/2011 | Uken | G02F 1/157 359/267 |
| 11,667,238 | B2 * | 6/2023 | Karmous | B60N 2/2863 359/871 |
| 2007/0091626 | A1 | 4/2007 | Hook | |
| 2008/0121034 | A1 | 5/2008 | Lynam et al. | |
| 2013/0021476 | A1 * | 1/2013 | Trummer | B60R 22/48 348/148 |
| 2013/0128333 | A1 * | 5/2013 | Agrawal | B60R 1/12 359/267 |
| 2019/0031051 | A1 | 1/2019 | Leaman et al. | |

OTHER PUBLICATIONS

PCT, International Written Opinion in International application No. PCT/US2020/044147 dated Oct. 30, 2020.

WIPO; International Preliminary Report on Patentability for International Patent Application No. PCT/US2020/044147 dated Feb. 24, 2020, 7 pages.

USPTO; Non-Final Action for U.S. Appl. No. 16/942,989 dated Sep. 29, 2021, 14 pages.

USPTO; Final Action for U.S. Appl. No. 16/942,989 dated Mar. 3, 2022, 10 pages.

USPTO; Non-Final Action for U.S. Appl. No. 16/942,989 dated May 26, 2022, 16 pages.

USPTO; Final Action for U.S. Appl. No. 16/942,989 dated Nov. 10, 2022, 10 pages.

* cited by examiner

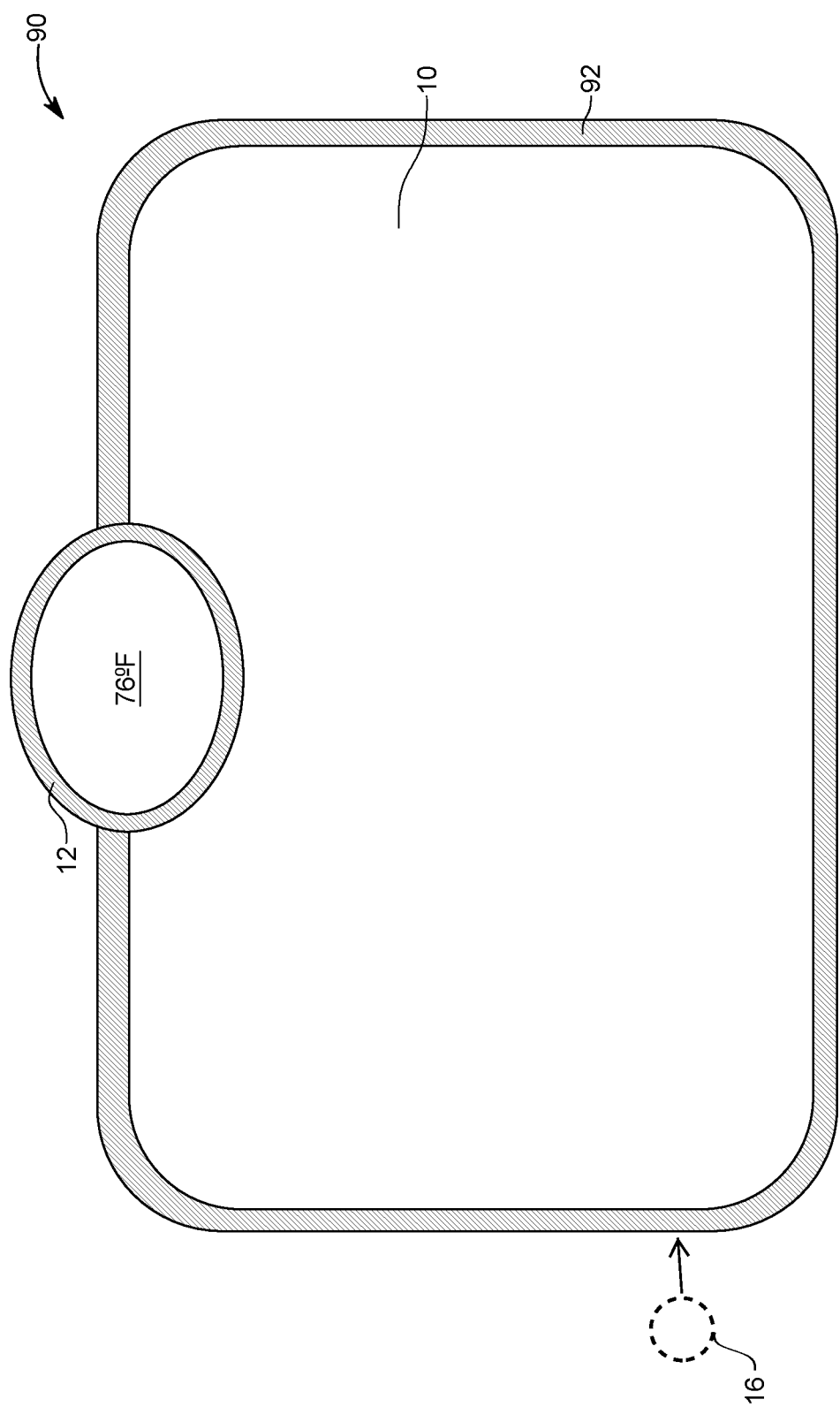

INFANT OBSERVATION MIRROR ASSEMBLY WITH TEMPERATURE DISPLAY ATTACHABLE TO AUTOMOBILE SEAT

CROSS-REFERENCE TO RELATED APPLICATIONS

This application is a continuation of U.S. Non-Provisional patent application Ser. No. 16/942,989 entitled "INFANT OBSERVATION MIRROR ASSEMBLY WITH TEMPERATURE DISPLAY ATTACHABLE TO AUTOMOBILE SEAT", which was filed on Jul. 30, 2020, which claims the benefit of priority to U.S. Provisional Patent Application No. 62/885,444 filed on Aug. 12, 2019, the contents of which is hereby incorporated by reference in its entirety.

TECHNICAL FIELD

The present invention relates to a temperature monitoring apparatus, and in particular to a portable mirror assembly configured for monitoring and reporting temperature sensed in a localized area of an automobile.

BACKGROUND

The use of rear-facing infant car seats in the back-seat results in the problem of the driver not being able to see the infant during travel. Use of rear-facing seats is frequently considered safer and may be legally required. Additionally, placement of a rear-facing infant car seat in the backseat of an automobile provides greater protection to the infant positioned therein. However, both factors (i.e., a rear-facing infant car seat and its placement in the backseat of an automobile) contribute to the driver's inability to see the infant in the infant car seat. With a forward-facing infant car seat, the driver can see the child in the rearview mirror while driving. However, with a rear-facing seat, all the driver can see is the back of the infant car seat but not the infant itself.

Further, while infant observation mirrors are available, there is no way for the rider to tell whether the ambient temperature in an area close to the infant is at a comfortable level, especially during extreme weather conditions on the outside of the vehicle such as a freezing cold temperature or a burning hot temperature. Depending on the air circulation levels within the vehicle, the temperature in the area around the infant can be quite different from the temperature in the front seat area where the driver is positioned. This can cause the driver to be anxious at times, due to concerns over the welfare of the infant.

A need exists for a driver to be able to monitor the ambient temperature in an area close to an infant in a rear facing car seat to ensure that it is within an acceptable temperature range.

SUMMARY

This summary is provided to introduce in a simplified form concepts that are further described in the following detailed descriptions. This summary is not intended to identify key features or essential features of the claimed subject matter, nor is it to be construed as limiting the scope of the claimed subject matter.

Disclosed herein is an infant observation mirror assembly with temperature display for attachment to a top portion of a rear vehicle seat. In various embodiments, the mirror assembly includes a main panel having opposed front and rear surfaces and a mirror embedded in the front surface thereof: a temperature display section defined on the front surface of the main panel: a positioning base coupled to the rear surface of the main panel whereby the main panel is pivotably attached to the positioning base for allowing rotation about a horizontal axis and a vertical axis; and a mounting harness attached to the positioning base, the mounting harness removably attachable to the top portion of the rear vehicle seat to hold the mirror assembly in a selected lateral and vertical position on the rear vehicle seat.

In one or more embodiments, the temperature display section is positioned at or near a top left corner of the front surface of the main panel.

In one or more embodiments, the temperature display section is positioned at a top central region of the front surface of the main panel.

In one or more embodiments, the temperature display section is positioned at a top central region of the front surface of the main panel, the temperature display extending above a top edge of the main panel.

In one or more embodiments, the temperature display section is configured for displaying temperature in Celsius and Fahrenheit units.

In one or more embodiments, the mirror assembly further comprises at least one temperature sensor in communication with the temperature display section.

In one or more embodiments, the mirror assembly further includes a battery receptacle for receiving at least one battery for powering the temperature display section and the at least one temperature sensor.

In one or more embodiments, the at least one temperature sensor is configured to wirelessly transmit a sensed temperature to a wireless receiver for display on a display screen.

In one or more embodiments, the temperature display section includes a lighting mechanism configured for illuminating a sensed temperature displayed at the temperature display section to facilitate night-time viewing.

In one or more embodiments, the main panel further includes at least one of an audible visual and a visual alarm for providing warning when a temperature displayed at the temperature display section is outside of predetermined temperature range.

In one or more embodiments, the main panel attaches to the base through a ball and socket connection.

In one or more embodiments, the mounting harness includes straps ending in snap connections for snugly engaging the top portion of the rear vehicle seat.

In one or more embodiments, the main panel includes an edging, wherein the edging includes one or more of a plurality of colors.

In one or more embodiments, the mirror is shatter proof.

In one or more embodiments, the mirror has a wide-angle whereby a width of the mirror is at least 1.5 times a height of the mirror.

The mirror assembly of claim 1, wherein the mirror has a wide-angle whereby a width of the mirror is at least two times a height of the mirror.

In one or more embodiments, the mirror is distortion-free.

In one or more embodiments, the temperature display section is positioned at or near a top left corner of the front surface of the main panel.

In one or more embodiments, the temperature display section is configured to display a mirror image of a sensed temperature.

BRIEF DESCRIPTION OF THE DRAWINGS

The foregoing, as well as the following Detailed Description of preferred embodiments, is better understood when read in conjunction with the appended drawings. For the purposes of illustration, there is shown in the drawings exemplary embodiments; however, the presently disclosed subject matter is not limited to the specific methods and instrumentalities disclosed.

The embodiments illustrated, described, and discussed herein are illustrative of the present invention. As these embodiments of the present invention are described with reference to illustrations, various modifications, or adaptations of the methods and or specific structures described may become apparent to those skilled in the art. It will be appreciated that modifications and variations are covered by the above teachings and within the scope of the appended claims without departing from the spirit and intended scope thereof. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

FIG. 2 is a front view of a main panel of another version of the mirror assembly, according to one or more embodiments of the presently disclosed subject matter.

DETAILED DESCRIPTION OF THE EMBODIMENTS

Below, the technical solutions in the examples of the present invention are depicted clearly and comprehensively with reference to the figures according to the examples of the present invention. Obviously, the examples depicted here are merely some examples, but not all examples of the present invention. In general, the components in the examples of the present invention depicted and shown in the figures herein can be arranged and designed according to different configurations. Thus, detailed description of the examples of the present invention provided in the figures below are not intended to limit the scope of the present invention as claimed, but merely represent selected examples of the present invention. On the basis of the examples of the present invention, all of other examples that could be obtained by a person skilled in the art without using inventive efforts will fall within the scope of protection of the present invention.

Figure 4:
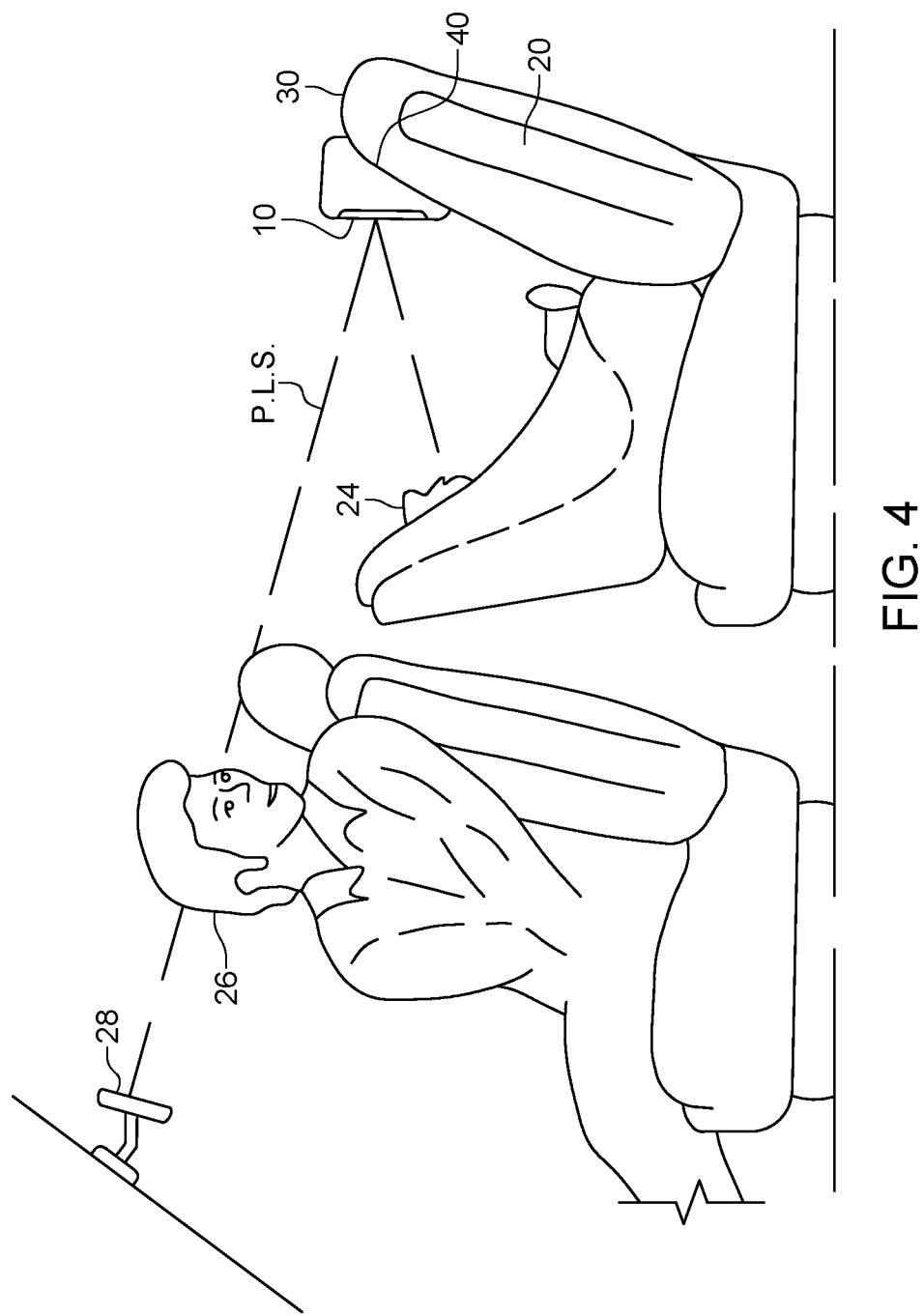
FIG. 4 is an elevation view of the mirror assembly and a rear vehicle seat relationship, according to one or more embodiments of the presently disclosed subject matter.

Embodiments of the presently disclosed subject matter include an infant observation mirror assembly with temperature display for attachment to a top portion of a rear vehicle seat. Referring to the FIGS. 1 through 4, according to various embodiments, the mirror assembly 40 comprises a main panel 90 having opposed front and rear surfaces and a mirror 10 embedded in the front surface thereof. In FIG. 4, the term P.L.S refers to "passenger/driver line of sight". The mirror assembly 40 also includes a temperature display section 12 defined on the front surface of the main panel 90. The mirror assembly 40 also includes a positioning base 14 coupled to the rear surface of the main panel whereby the main panel 90 is pivotably attached to the positioning base 14 for allowing rotation about a horizontal axis and a vertical axis. The mirror assembly 40 also includes a mounting harness 30 attached to the positioning base. The mounting harness 30 is removably attachable to the top portion of the rear vehicle seat to hold the mirror assembly in a selected lateral and vertical position on the rear vehicle seat 20.

Positioning base 14 of the mirror assembly 40 can be normally positioned against a rear vehicle seat 20 of a vehicle proximate the top thereof and secured thereto through the use of mounting harness 30.

Figure 1:
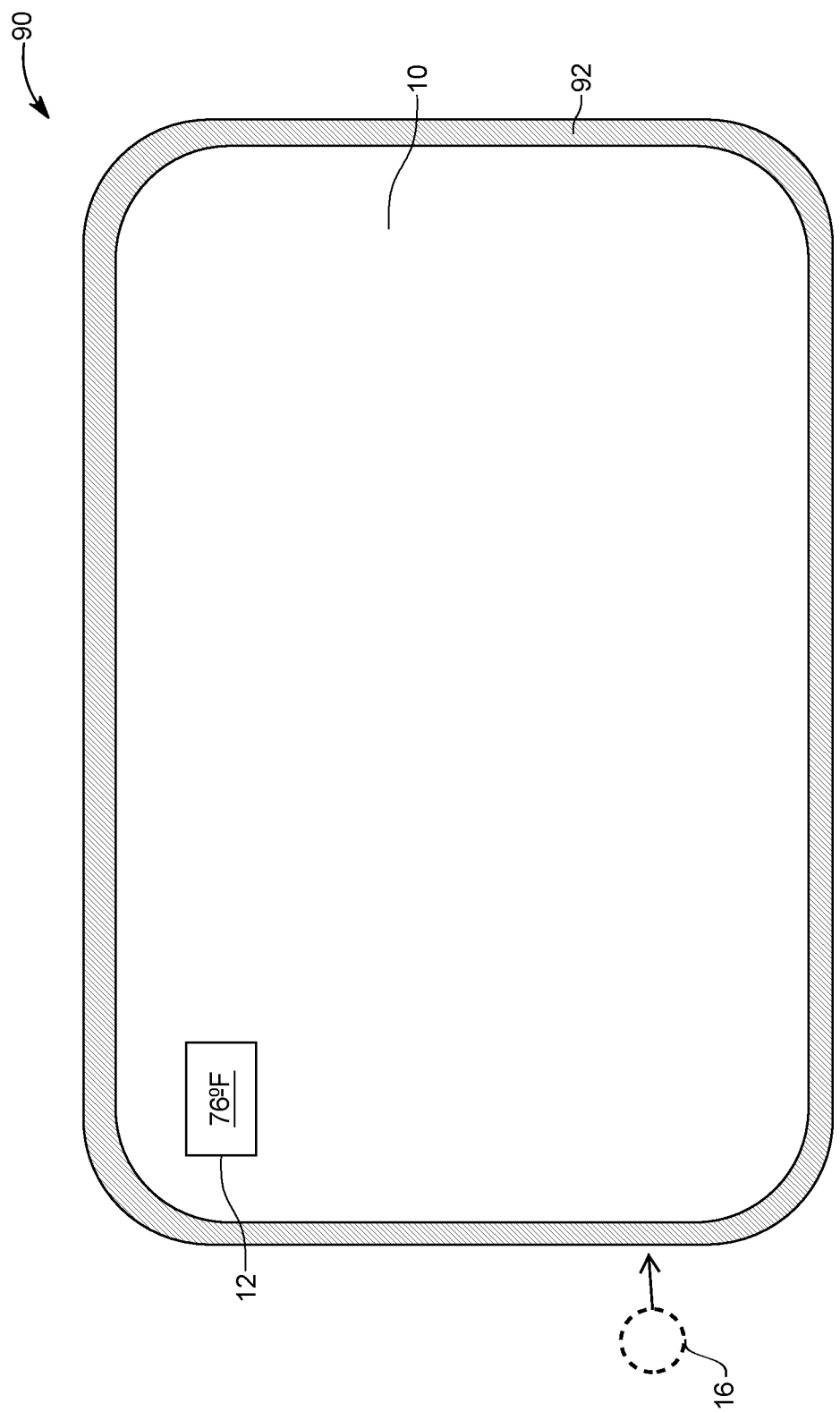
FIG. 1 is a front view of a main panel of a mirror assembly, according to one or more embodiments of the presently disclosed subject matter.
Figure 3A:
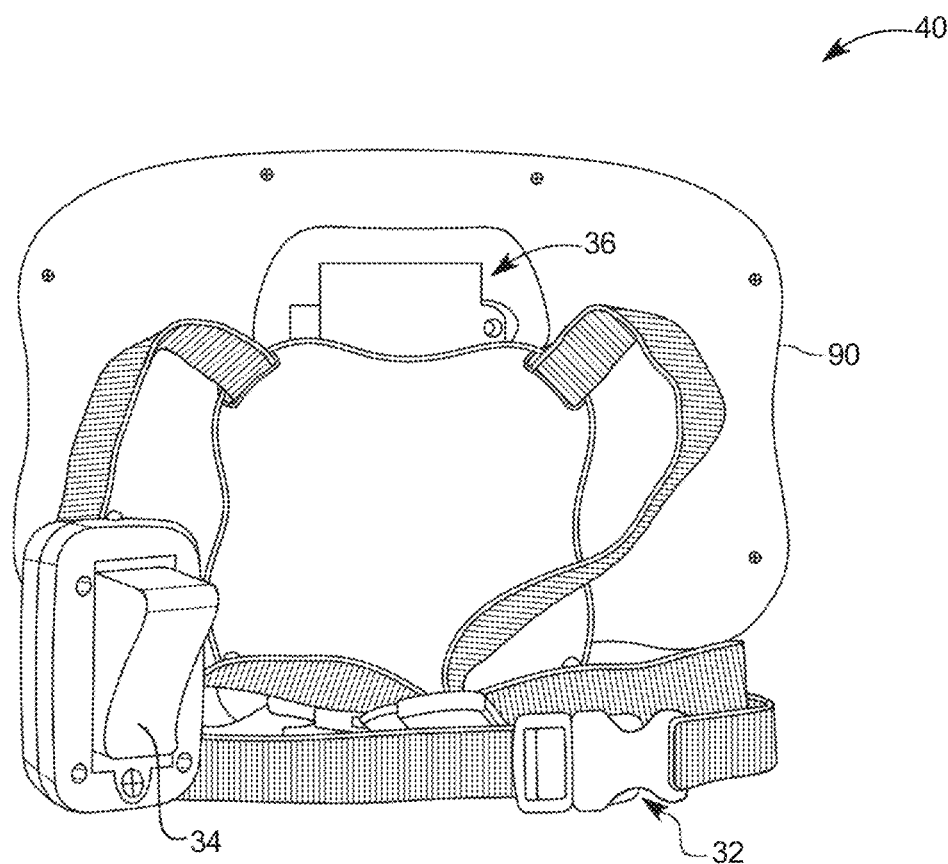
FIG. 3A is a rear perspective view of a version of the mirror assembly, according to one or more embodiments of the presently disclosed subject matter.
Figure 3B:
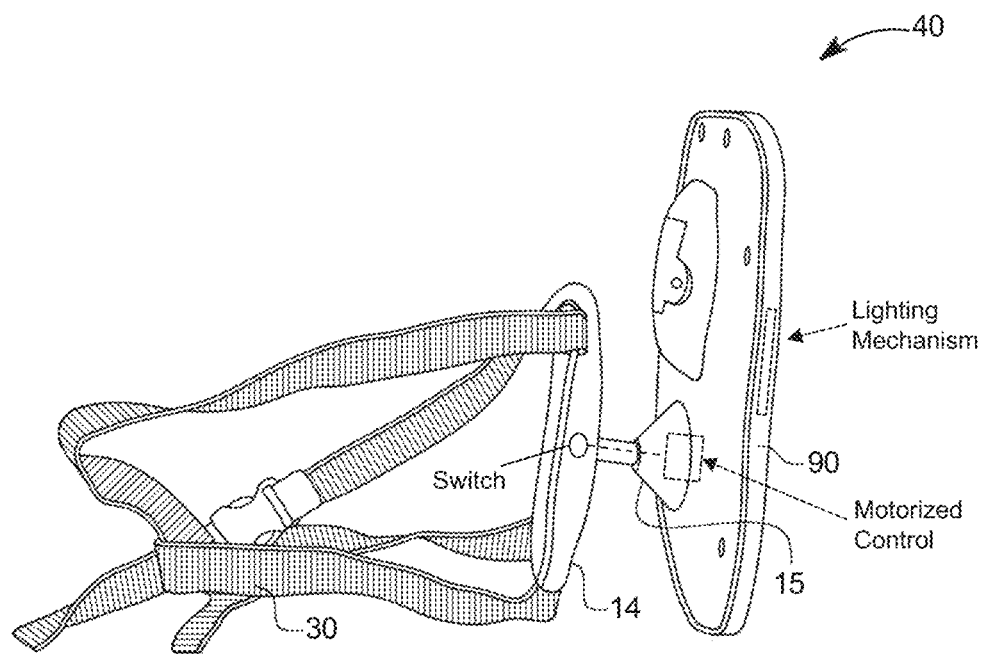
FIG. 3B is a side perspective view of a version of the mirror assembly, according to one or more embodiments of the presently disclosed subject matter.
Figure 3C:
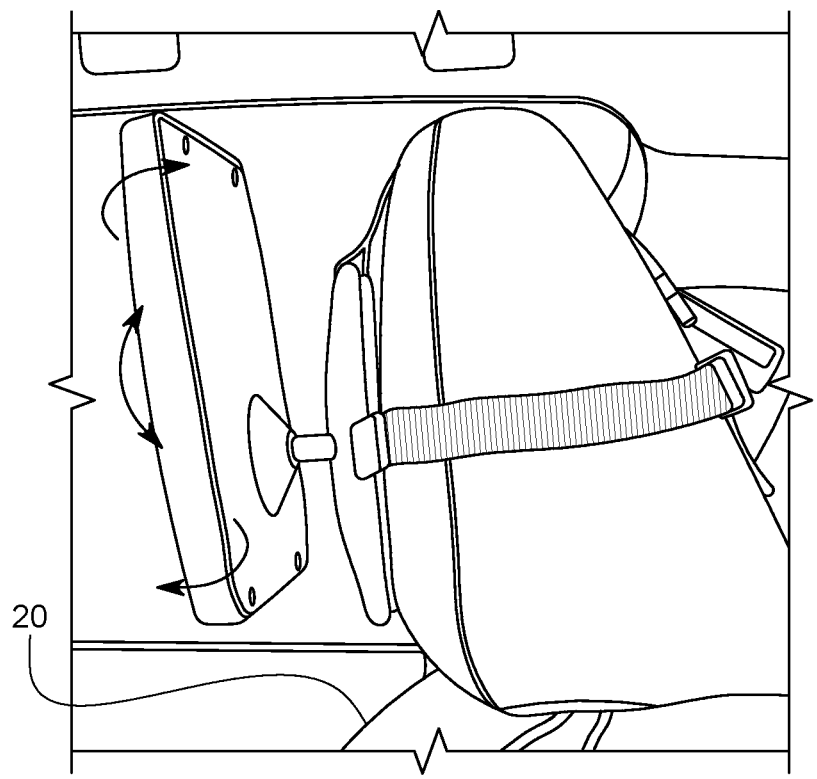
FIG. 3C is a side perspective view of a version of the mirror assembly attached to a top portion of a vehicle's rear seat, according to one or more embodiments of the presently disclosed subject matter.
Figure 3D:
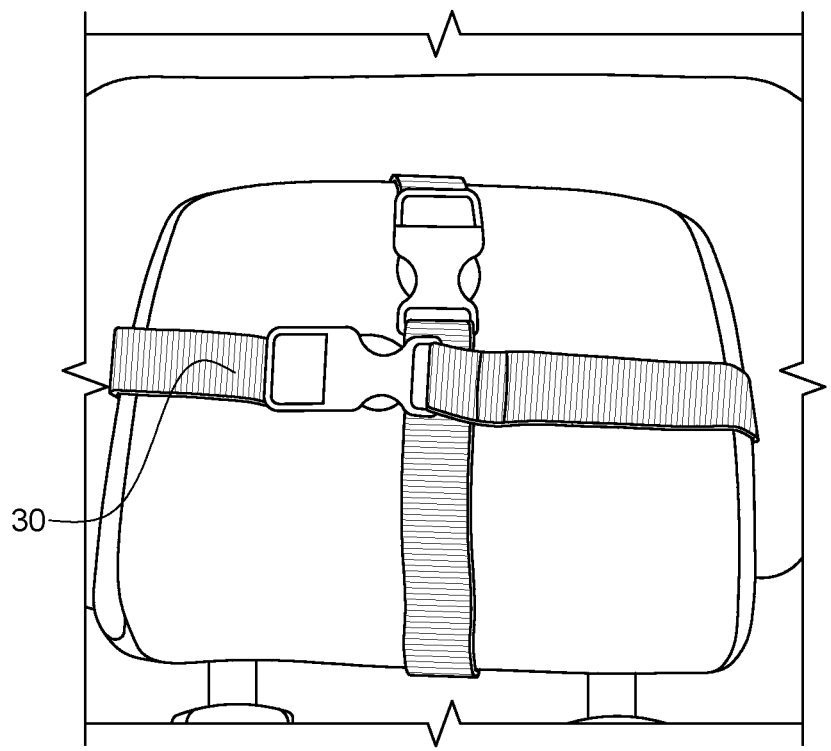
FIG. 3D is a rear perspective view of a version of the mirror assembly attached to a top portion of a vehicle's rear seat, according to one or more embodiments of the presently disclosed subject matter.

Temperature display section 12 can be positioned at or near a top left corner of the front surface of the main panel as shown, for example, in FIG. 1. In some embodiments, the temperature display section 12 is positioned at a top central region of the front surface of the main panel. In some embodiments, the temperature display section 12 is positioned at a top central region of the front surface of the main panel with the temperature display section 12 extending above a top edge of the main panel as shown, for example, in FIG. 2. In various embodiments, the temperature display section 12 is configured for displaying temperature in Celsius and Fahrenheit units.

In various embodiments, the mirror assembly 40 further comprises at least one temperature sensor 16 (represented in dashed line in FIGS. 1-2, particular position and shape not shown) in communication with the temperature display section 12. In various embodiments, the temperature sensor is configured to sense an ambient temperature of an area close to the infant in an infant car seat. In some embodiments, the mirror assembly 40 can include more than one temperature sensors wherein the temperature display section 12 is configured to display an average of the temperatures sensed by all of the temperature sensors. In some embodiments, the mirror assembly or the temperature sensor is configured to wirelessly transmit a sensed temperature to a wireless receiver for display on a display screen. In one embodiment, the display screen may be the display screen on a computing device such as a mobile telephone. In one embodiment, the display screen may be the display screen on the dashboard of a vehicle, wherein the vehicle can receive the sensed temperature transmitted by the mirror assembly or the temperature sensor and provide the same for display on the display screen on the vehicle's dashboard.

In various embodiments, the temperature display section 12 can include a lighting mechanism configured for illuminating a sensed temperature displayed at the temperature display section to facilitate night-time viewing; this may advantageously provide for the reading of the sensed temperature by the driver of the vehicle when it is dark within the vehicle. The lighting mechanism can also provide a soft light thereby enhancing the reflected image of the temperature display seen by the driver. In some embodiments, the lighting mechanism may be automated such that it can automatically turn on and off and otherwise adjust its brightness depending on the lighting conditions in its vicinity of the mirror assembly without the need for user intervention. In some embodiments, additional lighting mechanisms may be provided, for example, to illuminate different regions of the main panel 90 and/or to illuminate the face of the infant.

In some embodiments, the mirror assembly 40 in general, or the main panel 90 in particular, can further include an audible alarm and a visual alarm for providing warning signals when a temperature sensed or the temperature displayed at the temperature display section is outside of predetermined temperature range.

In order to provide various functions as described above, the mirror assembly 40 can be provided with a controller and a memory accessible by the controller, and other components as needed for the performance of the functions described herein. Also, in various embodiments, the mirror assembly 40 further includes a battery receptacle 36 (FIG. 3A) for receiving one or more batteries. The batteries can operate to power the various components of the mirror assembly 40 that require power including the controller, the temperature display section 12, the at least one temperature sensor, the lighting mechanism(s) and any other components that require power for their operation.

A driver 26 or other occupant can simply turn his or her head and view an infant 24, seated in an infant seat and facing rearwardly of the vehicle, directly through the mirror 10 of mirror assembly 40, and when doing so, will also be able to read the temperature displayed on temperature display section 12. Alternatively, the driver can view the infant through the rearview mirror without turning his or her head since the field of vision through the rearview mirror is normally adequate to include the mirror 10 so that the infant's face along with the temperature displayed on temperature display section 12 is visible to the driver when looking through the front rearview mirror 28 of the vehicle. Thus, with the foregoing assembly there is no need for a front seat occupant to bodily turn and lean over the front of the seat in order to view the temperature displayed on temperature display section 12.

In various embodiments, mounting harness 30 of mirror assembly 40 can include straps ending in snap connections 32 (FIG. 3A) for snugly engaging the top portion of the rear vehicle seat 20. In some embodiments, mounting harness 30 is made of a strong, synthetic material.

In various embodiments, the main panel 90 attaches to the base through a ball and socket connection 15. Mirror assembly 40 further includes a main panel 90. FIGS. 1 and 2 illustrate in detail a front surface of the main panel 90. Main panel 90 includes a front surface and a rear surface, with mirror 10 embedded in the front surface thereof. As shown in FIG. 1, main panel 90 can include an edging 92 that surrounds the outer edge of mirror 10. The edging 92 can be of one or more colors commonly available in the marketplace; in some embodiments, the color of the edging matches the color of the interior upholstery of the vehicle. Edging 92 can be made of foam, plastic, rubber, or other soft material. Edging 92 operates to soften any contact between the infant or others and the mirror assembly 40.

In various embodiments, an important factor in selecting the mirror 10 material is the elimination of the possibility of broken glass or similar sharp fragments of material. Accordingly, in various embodiments, the mirror 10 is shatter proof whereby the mirror may not shatter on impact by forces. In at least one embodiment, the mirror is constructed of a plastic material, which may prevent the mirror from shattering when dropped. In various embodiments, the mirror 10 has a wide-angle whereby a width of the mirror 10 is at least 1.5 times a height of the mirror for example, 2, 3, 4, or 5 times the height of mirror 10. Mirror 10 of wide-angle can provide a wider field of view reducing blind spots. In various embodiments, the mirror 10 is of high-quality construction whereby the mirror is distortion-free. In some embodiments, mirror 10 has a generally rectangular, planar shape and is made of a rigid, light weight material, such as plastic, with a non-glass reflective coating on the mirror reflecting surface side. Although rectangular in shape, the corners of the mirror 10 are rounded for safety. In one embodiment, mirror 10 is 6 inches wide by 3 inches tall.

As shown in FIG. 4, rear vehicle seat 20 contains an infant car safety seat attached to the vehicle by means of a seat belt (seat belt not shown). An infant 24 is placed in the infant car seat facing the back rest of the rear vehicle seat 20. Mirror assembly 40 having a reflecting surface such as mirror 10 on a front surface of main panel 90, with mirror assembly 40 adapted to being attached to the rear vehicle seat 20. This permits a driver 26 to observe the infant 24 along with the ambient temperature in an area close to the infant 24 by means of an image reflected from the mirror 10 to the front rearview mirror 28 of the vehicle.

In some embodiments, mirror assembly 40 can further include an automated motorized control set up for adjusting the disposition of the main panel relative to the positioning base. For example, in one embodiment, a switch operating a motorized control may allow for the adjustment of the positioning of the main panel as the main panel pivots about the positioning base in response to a user manipulating the switch in a similar manner a side mirror of a car pivots in response to the manipulation of a (four-way) switch. In a further embodiment, a remote control may be provided such that the automated motorized control for adjusting the main panel relative to the positioning base can be operated remotely using the remote control.

Embodiments of the disclosed subject matter make use of the optical axis that extends from the eyes of a driver looking into a rear view mirror of a motor vehicle into which is reflected an image from mirror 10 and from temperature display section 12 of main panel 90 attached to the rear vehicle seat 20. This enables the driver 26 to easily monitor the activity of an infant 24 along with the temperature in an area close to the infant in a rearward facing safety seat. Thus it can be seen that embodiments of the disclosed subject matter described herein can provide for an inexpensive, easily installed and easily re-positioned device by which a driver of a vehicle can monitor the temperature in the region contiguous to the infant in the safety seat while monitoring the activity of the infant in the safety seat that faces in the opposite direction from the line of sight of the driver.

In operation, mirror 10 stays fixed in its normal position to view through the rear window of the car. Ball and socket connection 15 allows the main panel 90 to be pivoted about a substantially vertical and a substantially horizontal axis. As a result of this adjustment, the mirror 10 may be positioned to best reflect the face of the infant carried in the reverse-facing infant car seat in a manner that will allow the reflection, along with the temperature display, to be most easily seen by the driver using the rearview mirror. Accordingly, mirror 10 can be swiveled through ball and socket connection 15 so that the driver 26 on looking at the mirror 10, will see a temperature as sensed by a temperature sensor of mirror assembly 40 being displayed on temperature display section 12 of main panel 90 along with the face portion of the infant 24. Thus, if the temperature in the area contiguous to the infant (as sensed by a temperature sensor of mirror assembly 40) is outside of a predetermined range, the driver can advantageously adjust the heating or cooling setting of the vehicle or otherwise take appropriate action such as for example, opening a vehicle window, to ensure the temperature in the area contiguous to the infant returns to an acceptable level or comfortable level.

As seen in FIGS. 1 and 2, temperature display section 12 of main panel 90 of mirror assembly 40 can display a temperature that is sensed in an area contiguous to the infant while mirror 10 can reflect the face of the infant 24 carried in a rear-facing infant car seat, allowing the driver 26 to see reflection of the temperature sensed in an area near the infant 24 by use of the front rearview mirror 28. Accordingly, embodiments of the presently disclosed subject matter can provide a novel infant observation mirror attachable to a rear vehicle seat that also displays temperature of a region contiguous to the infant.

In one or more embodiments, the temperature display section is positioned at or near a top left corner of the front surface of the main panel. In further embodiments, the temperature display section can be positioned in other areas of the main panel.

In one or more embodiments, the temperature display section is configured to display a mirror image of sensed temperature. The temperature display section can accordingly display an inverted image of the sensed temperature, which when viewed in the front rearview mirror 28 would get inverted back whereby the driver can see a regular reading of the sensed temperature via the front rearview mirror 28—thus rendering the temperature easier to read by the driver. In one embodiment, the main panel or the mirror assembly includes a toggle switch 34 (FIG. 3A) that allows the temperature display to be toggled between a regular temperature display and a mirror-image temperature display. This may advantageously permit a viewer to adjust the display that is optimal for the viewer's requirement or preference.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

These and other changes can be made to the disclosure in light of the Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed is:

1. An infant observation mirror assembly for attachment to a top portion of a vehicle seat, the mirror assembly comprising:
    a main panel having opposed front and rear surfaces and a mirror embedded in the front surface thereof;
    a temperature display section defined on the front surface of the main panel;
    a positioning base coupled to the rear surface of the main panel whereby the main panel is pivotably attached to the positioning base for allowing rotation about a horizontal axis and a vertical axis;
    a mounting harness attached to the positioning base, the mounting harness removably attachable to the top portion of a vehicle's seat to thereby hold the mirror assembly in a selected lateral and vertical position on the vehicle's seat; and
    at least one temperature sensor that is configured to sense an ambient temperature contiguous to the main panel, wherein the temperature display section is in communication with the at least one temperature sensor and displays the ambient temperature sensed contiguous to the main panel.

2. The mirror assembly of claim 1, wherein the temperature display section is positioned at or near a top left corner of the front surface of the main panel.

3. The mirror assembly of claim 1, wherein the temperature display section is positioned at a top central region of the front surface of the main panel.

4. The mirror assembly of claim 1, wherein the temperature display section is positioned above the mirror to provide an unobstructed reflected image in the mirror.

5. The mirror assembly of claim 1, wherein the temperature display section is configured for displaying temperature in Celsius and Fahrenheit units.

6. The mirror assembly of claim 1, wherein the mirror assembly further includes a power source configured to power the temperature display section and the at least one temperature sensor, wherein the power source is engageable along a rear surface.

7. The mirror assembly of claim 1, wherein the main panel further includes a lighting mechanism comprising a light configured to illuminate a face of an infant within a car safety seat attached to the vehicle seat.

8. The mirror assembly of claim 1, wherein the positioning base comprises an extension arm having a terminal end comprising a ball extending away from the positioning base, wherein the terminal end comprises a ball configured to pivotally engage and be enclosed by a socket disposed along a portion of the rear surface of the main panel.

9. The mirror assembly of claim 1, wherein the mounting harness includes straps, each strap having a first end comprising a snap connections and a second end comprising a loop configured to enclose and attach to a peripheral portion of the positioning base.

10. The mirror assembly of claim 1, wherein the main panel includes an edging comprising a soft material.

11. The mirror assembly of claim 1, wherein the mirror is shatter proof.

12. The mirror assembly of claim 1, wherein the mirror has a wide-angle whereby a width of the mirror is between 1.5 and 5 times a height of the mirror.

13. The mirror assembly of claim 1, wherein the mirror is distortion-free.

14. The mirror assembly of claim 1, wherein the temperature display section is configured to display a mirror image of a sensed temperature.

15. The mirror assembly of claim 1, further comprising a remote control toggle switch in operable communication with the temperature display section to switch the ambient temperature to and from a mirror-image of the ambient temperature.

16. The mirror assembly of claim 1, wherein the mirror comprises a non-glass reflective coating.

17. The mirror assembly of claim 1, further comprising a motorized control disposed within at least one of the main panel and the positioning base and configured to position the main panel relative to the positioning base.

18. The mirror assembly of claim 17, wherein the motorized control is in communication with a switch.

19. The mirror assembly of claim 18, wherein the switch is disposed on a remote control.

\* \* \* \* \*